US012811615B2

(12) United States Patent
Bhadana et al.

(10) Patent No.: US 12,811,615 B2
(45) Date of Patent: Nov. 24, 2026

(54) METHOD AND APPARATUS FOR IMPROVED FIXING OF AN ANTENNA VIOLATION IN A NET OF AN INTEGRATED CIRCUIT

(71) Applicant: NXP USA, Inc., Austin, TX (US)

(72) Inventors: Varun Bhadana, Faridabad (IN); Himanshu Mangal, Agra (IN); Sachin Kalra, Indirapuram (IN); Deepali Chopra, Patiala (IN)

(73) Assignee: NXP USA, Inc., Austin, TX (US)

( * ) Notice: Subject to any disclaimer, the term of this patent is extended or adjusted under 35 U.S.C. 154(b) by 330 days.

(21) Appl. No.: 18/758,233

(22) Filed: Jun. 28, 2024

(65) Prior Publication Data

US 2025/0343564 A1 Nov. 6, 2025

(30) Foreign Application Priority Data

May 6, 2024 (IN) ............................ 202441035625

(51) Int. Cl.
*H04B 1/04* (2006.01)
*H04B 1/16* (2006.01)

(52) U.S. Cl.
CPC ......... *H04B 1/0458* (2013.01); *H04B 1/0483* (2013.01); *H04B 1/1615* (2013.01)

(58) Field of Classification Search
CPC ... H04B 1/0458; H04B 1/0483; H04B 1/1615
See application file for complete search history.

(56) References Cited

U.S. PATENT DOCUMENTS

| | | | | |
|---|---|---|---|---|
| 6,194,233 B1 * | 2/2001 | Bedner | H10W 20/031 257/E21.582 |
| 6,792,578 B1 | 9/2004 | Brown et al. | |
| 11,694,015 B2 | 7/2023 | Mangal et al. | |
| 2007/0234264 A1 * | 10/2007 | Ono | G06F 30/398 716/112 |

(Continued)

FOREIGN PATENT DOCUMENTS

JP 11186394 A 7/1999

OTHER PUBLICATIONS

Tsung-Yi Ho et al: "Multilevel routing with antenna avoidance", Physical Design, ACM, 2 Penn Plaza, Suite 701 New York NY 10121-0701 USA, Apr. 18, 2004, pp. 34-40.

(Continued)

*Primary Examiner* — David Bilodeau

(57) ABSTRACT

A method and system for fixing antenna violation of antenna in an integrated circuit. A pin of a macro circuit is selected, the pin being electrically coupled to a gate of a transistor. A gate area and an antenna ratio for a layer of the integrated circuit is determined and a net area of a net which avoids antenna violation in the integrated circuit is calculated. A length of the net with the net area based on the gate area and the antenna ratio is identified. The antenna cell is positioned across a remainder of a segment of the net in a layer resulting from a portion of the segment being removed, where a distance from the portion to the gate over the net is the length and where the antenna cell routes the net to a top layer of the integrated circuit independent of a position of the antenna cell in the integrated circuit.

8 Claims, 5 Drawing Sheets

(56) References Cited

U.S. PATENT DOCUMENTS

| | | | | |
|---|---|---|---|---|
| 2009/0158230 | A1* | 6/2009 | Bonges, III | G06F 30/367<br>716/119 |
| 2017/0270233 | A1* | 9/2017 | Hook | G06F 30/392 |
| 2017/0277821 | A1* | 9/2017 | Hook | G06F 30/392 |
| 2023/0086010 | A1* | 3/2023 | Gonzalez | G01R 31/2623<br>324/762.09 |
| 2024/0363558 | A1* | 10/2024 | Chen | H10D 84/0186 |

OTHER PUBLICATIONS

Martin Andreas: "Review on the reliability characterization of plasma-induced damage", Journal of Vacuum Science and Technology: Part B, AVS / AIP, Melville, New York, NY, US, vol. 27, No. 1, Feb. 9, 2009, pp. 426-434.

* cited by examiner

METHOD AND APPARATUS FOR IMPROVED FIXING OF AN ANTENNA VIOLATION IN A NET OF AN INTEGRATED CIRCUIT

CROSS-REFERENCE TO RELATED APPLICATIONS

This application claims the priority under 35 U.S.C. § 119 of India patent application Ser. No. 20/244,1035625, filed on 6 May 2024, the contents of which are incorporated by reference herein.

FIELD OF USE

The present disclosure relates generally to integrated circuit design, and more particularly, to a method and apparatus for improved fixing of an antenna violation in a net of an integrated circuit.

BACKGROUND

Integrated circuits comprise various macro circuits. The macro circuit defines a certain type of circuit of the integrated circuit with a particular function which is instantiated a plurality of times in the integrated circuit such as a memory circuit. Macro circuits could be arranged in various rows and columns in the integrated circuit where a space between two adjacent macro circuits in rows or columns is referred to as a channel. Further, each macro circuit such as a memory circuit is electrically coupled to another circuit such as a memory controller by way of various nets of the integrated circuit which enable signal routing between the memory circuit and the memory controller.

The macro circuits and nets are implemented in a plurality of metal layers of the integrated circuit. At higher technology nodes, the net is routed within the channels of the macro circuits because fewer metal layers are available for routing and diodes positioned within the channel are coupled to a gate of a transistor of the macro circuit to avoid an antenna violation by the net. But as a technology node decreases, the integrated circuit has more metal layers and the net is routed over the macro circuits using the available metal layers, allowing for a channel size, memory overhead, and die size to be reduced. With this reduced size, no sites exist within the channels to position the diodes if there is an antenna violation. So, a routing tool needs to perform layer hopping to remedy any antenna violation instead of adding diodes.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to an improved method and apparatus for fixing an antenna violation in an integrated circuit (IC). Conventional layer hopping is not performed predictably to specific layers in the integrated circuit as metal is routed in the IC resulting in design rule checking convergence challenges. Additionally, a routing tool takes detours in a layer to perform the layer hopping and a highest layer to which the tool hops could vary depending on a net adding to delay variations. To address these challenges, an antenna cell is defined. The antenna cell is an interconnect structure with a predefined structure which is placed on a segment of a net in an integrated circuit having the antenna violation at a predefined position to remedy the antenna violations. The same antenna cell structure is used to remedy any antenna violations in the integrated circuit. The antenna cell has a layer hoping to a top layer of the integrated circuit and the positioning is based on a net area. The disclosed use and positioning of the antenna cell in the net with the antenna violation reduces delay variation between nets, allows for easily modeling the antenna cell for timing closure, and improving design rule checking convergence while avoiding a need for placement of an antenna diode to remedy the antenna violation. Well known instructions, protocols, structures, and techniques have not been shown in detail in order not to obfuscate the description.

Figure 1:
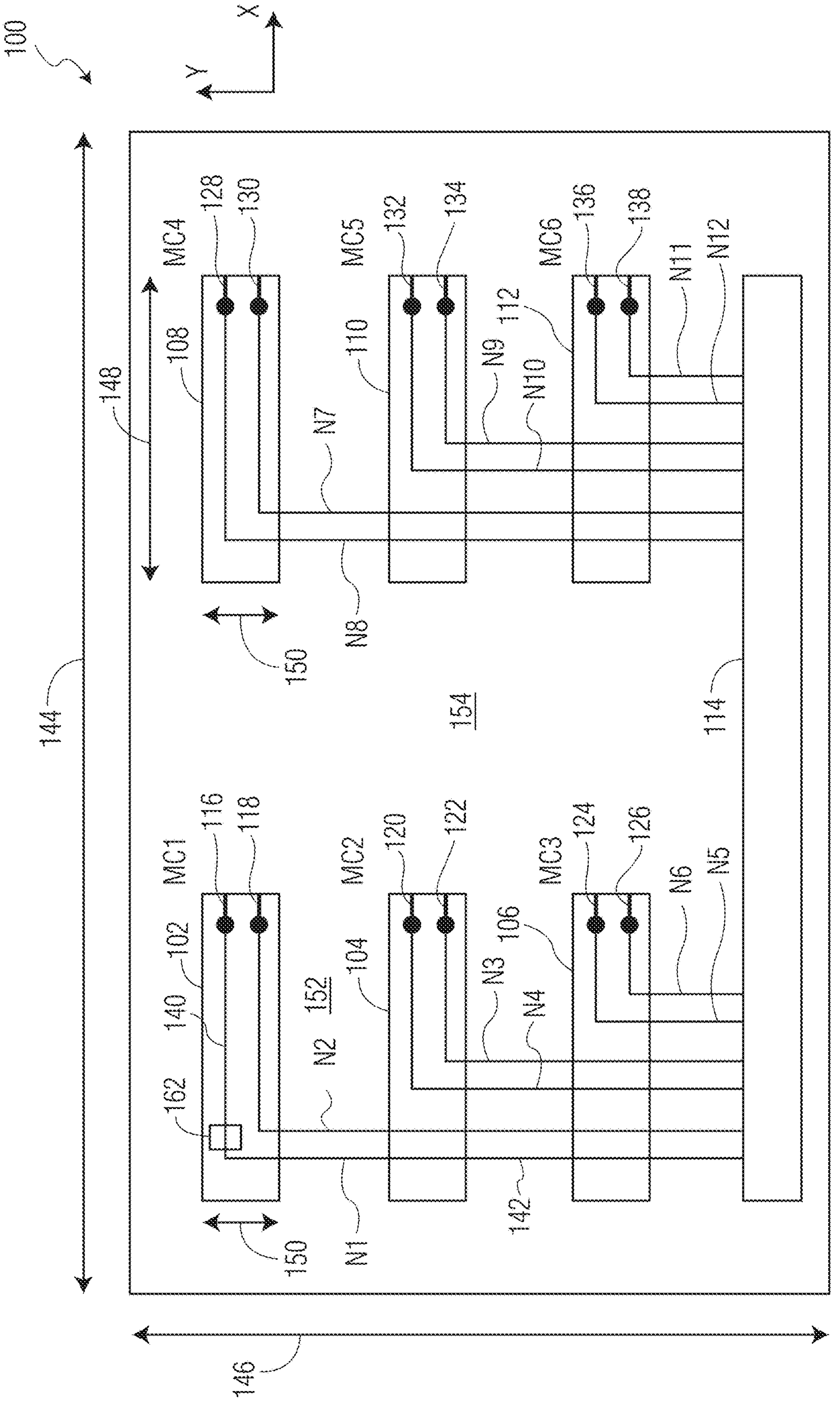
FIG. 1 is an example block diagram of an integrated circuit (IC) layout in accordance with an embodiment.

FIG. 1 is an example block diagram of a layout of an integrated circuit (IC) 100 in accordance with an embodiment. The integrated circuit 100 includes a plurality of macro circuits 102-112 of which macro circuits MC1 to MC6 are shown, each having a length 148 shown in an X direction (horizontal direction) and a width 150 shown in an Y direction (vertical direction). The plurality of macro circuits may be arranged in a plurality of rows such as MC1, MC4; MC2, MC5; MC3, MC6 and a plurality of columns such as MC1, MC2, MC3 or MC4, MC5, MC6 with a channel space (referred also as channel) separating each memory circuit in the rows and columns in a X and Y direction. A channel 152 formed between adjacent memory blocks in two rows (e.g., a channel formed between the first and second memory blocks MC1 and MC2) corresponds to a horizontal channel. Similarly, a channel 154 formed between adjacent memory blocks in two columns (e.g., a channel formed between the first and fourth memory blocks MC1 and MC4) corresponds to a vertical channel.

It will be apparent to a person skilled in the art that the IC 100 is shown to include six macro circuits (i.e., the first through sixth macro circuits MC1-MC6) to make the illustrations concise and clear and should not be considered as a limitation of the present disclosure. In various other embodiments, the macro circuit can include more or less than six macro circuits, without deviating from the scope of the present disclosure. Such macro circuits can be arranged in various rows and columns with a number of rows and a number of columns being less or greater than three and two, respectively. Further, each row can include more or less than two macro circuits, and each column can include more or less than three macro circuits.

The integrated circuit 100 has various metal layers (not shown) associated therewith. Such metal layers can be a combination of horizontal layers (with metal in an X direction) and vertical metal layers (with metal in a Y direction) where a number of the metal layer defines a direction of routing in the layer. As a technology node used to fabricate the integrated circuit 100 decreases, a number of available metal layers in the integrated circuit 100 significantly increases. Various metal layers of the available metal layers can be utilized to implement the macro circuits. Remaining metal layers can be utilized for facilitating signaling between a macro circuit and another circuit 114 in an example.

Routing is a process of electrically connecting a pin of a macro circuit to the other circuit 114 by a metal trace to define a net between the pin and the other circuit 114. Each macro circuit may have a plurality of pins. For example, macro circuit MC1 may have respective pins 116-118, macro circuit MC2 may have respective pins 120-122, macro circuit MC3 may have respective pins 124-126, macro circuit MC4 may have respective pins 128-130, macro circuit MC5 may have respective pins 132-134, and macro circuit MC6 may have respective pins 136-138. In an example, the macro circuit may be a memory circuit and the other circuit 114 may be a memory controller. For the sake of ongoing discussion, it is assumed that the integrated circuit 100 has a base layer and first through tenth metal layers (not shown) associated therewith above the base layer, where a higher number layer is further separated from the base layer by more intermediate layers. The base layer and first through fourth metal layers are utilized for the macro circuits and remaining six metal layers (i.e., the fifth through tenth metal layers) are available to be utilized for the signal routing in an example. Further, a higher metal layer corresponds to a higher numbered layer. In an example, the integrated circuit layout may also have an eleventh layer which is a top layer of the integrated circuit. The routing of a layer is typically performed after floor planning of a semiconductor fabrication process where one or more of a location, shape, and size of the macro circuits and pins is determined for a layer of the integrated circuit 100 but before standard cells of the macro circuit which implement logical functions is placed in the layer of the integrated circuit 100. The routing is performed for each layer starting from a lower layer and continuing to the upper layers. For higher technology nodes, the net is arranged in the channels 152, 154 but as a technology node decreases, additional layers are available for routing nets over macro circuits and a size of the channels 152, 154 is reduced such that the channel becomes too small to fit the net. In an example, the IC layout includes nets N1 to N12 from a respective pin of a macro circuit to the other circuit 114. N1-N2 may be routed over macro circuit MC2 and N3-N4 may be routed over MC3 in an example. In the integrated circuit 100, a respective segment of a net such as horizontal segment 140 of N1 is oriented in a horizontal X direction by way of a horizonal metal layer of the macro circuit (e.g., second, fourth metal layer) and a respective segment of a net such as vertical segment 142 of the net N1 is oriented in a vertical Y direction by way of a vertical layer (e.g., fifth metal layer, seventh metal layer, ninth metal layer). The segment 140 and segment 142 may define the net N1. In an example, the segment 140 of the net N1 electrically coupled to the pin 116 is transposed to the segment 142 of the net N1 in a crossover manner by routing the segment 140 in a horizontal metal layer of the macro circuit which is electrically coupled by a via to the segment 142 in a vertical metal layer of the macro circuit. Depending on the macro circuit height and width, the net may be as long as 250 μm to 300 μm with a defined width to reduce signal delay over the net and with a metal trace which could have a double width to reduce net delays.

It will be apparent to a person skilled in the art that the first through sixth macro circuits MC1-MC6 are each shown to be electrically coupled with the other circuit 114 by way of two nets to make the illustrations concise and clear and should not be considered as a limitation of the present disclosure. In various other embodiments, each macro circuit of the first through sixth macro circuits MC1-MC6 may be electrically coupled with the other circuit 114 by way of more than two nets, without deviating from the scope of the present disclosure. Further, the IC may have fewer or more layers depending on a technology node.

Each pin may be further electrically coupled to a respective gate of a transistor (not shown) in the macro circuit and a segment of a net in a layer is electrically coupled to the pin. The segment of the net in a layer electrically coupled to the pin is a continuous metal trace in a layer. The segment has a length and could generate an antenna violation. If the ratio of metal area of the segment electrically connected to the gate of a transistor to a total gate area is greater than an antenna ratio threshold defined by the semiconductor fabrication process, then an antenna violation occurs where excessive charge is accumulated on the segment electrically coupled to the gate. The amount of accumulated charge depends on an area of the net electrically connected to the gate and during plasma etching the excessive accumulated charges could discharge through a thin gate oxide of the transistor and cause permanent damage to the gate oxide. In an example, the segment 140 may cause an antenna violation, A net may be routed over a plurality of layers. A segment of the net may be routed in each layer. Each layer of the integrated circuit 100 may have a length of a segment of the net, a width of the segment of the net, and area of the segment of the net and one or more of the length and width may be the same or different in various layers. Table 1 shows that the net has a plurality of segments with a defined length, width, and area routed over a plurality of layers.

TABLE 1

| Layer Name | Width | Length | Area |
|---|---|---|---|
| M1 | 0.02 | 0.42 | 0.0084 |
| M2 | 0.02 | 0.23 | 0.0046 |
| M3 | 0.02 | 0.33 | 0.0066 |
| M4 | 0.02 | 0.3 | 0.006 |
| M5 | 0.038 | 0.82 | 0.03116 |
| M6 | 0.076 | 0.56 | 0.04256 |
| M7 | 0.076 | 0.2 | 0.0152 |
| M8 | 0.076 | 7.8 | 0.5928 |
| M9 | 0.076 | 71.48 | 5.43248 |

For example, a segment of the net in layer M2 may have a length of 0.23 μm, width of 0.02 μm, and area of 0.0046 $\mu m^2$ while a segment of the net in M9 may have a length of 71.48 μm, width of 0.076 μm, and area of 5.43248 $\mu m^2$. The number of layers of the IC is exemplary in nature and in other examples the IC may have fewer or more layer. In an example, 5 nm technology node may include layers M1 to M11. Further, a layer is identified by Mn where n is an integer which indicates the metal layer.

A gate area may be 0.004 μm. A ratio of the area of a segment of the net in a layer to the gate area may be used to calculate an antenna ratio for each layer, referred to a process antenna ratio (PAR). Table 2 shows the PAR for each layer along with a cumulative area ratio (CAR) for each layer.

TABLE 2

| Layer Name | Width | Length | Area | PAR (Area/Gate area) | CAR |
|---|---|---|---|---|---|
| M1 | 0.02 | 0.42 | 0.0084 | 2.1 | 2.1 |
| M2 | 0.02 | 0.23 | 0.0046 | 1.15 | 3.25 |
| M3 | 0.02 | 0.33 | 0.0066 | 1.65 | 4.9 |
| M4 | 0.02 | 0.3 | 0.006 | 1.5 | 6.4 |
| M5 | 0.038 | 0.82 | 0.03116 | 7.79 | 14.19 |
| M6 | 0.076 | 0.56 | 0.04256 | 10.64 | 24.83 |
| M7 | 0.076 | 0.2 | 0.0152 | 3.8 | 28.63 |
| M8 | 0.076 | 7.8 | 0.5928 | 148.2 | 176.83 |
| M9 | 0.076 | 71.48 | 5.43248 | 1358.12 | 1534.95 |

An antenna violation is a condition when the CAR exceeds the antenna ratio threshold. The antenna ratio threshold may be 500 in this example. If the antenna ratio threshold will be violated by the net, the net may be changed to remedy the antenna violation. In Table 2, the antenna violation occurs in layer M9 with a CAR of 1285.708 which exceeds the antenna ratio threshold.

Layer hopping is one solution for remedying the antenna violation. Layer hopping involves breaking up an otherwise longer segment of a net into smaller segments during routing and using jumpers from a current layer to a higher metal layers and then back to the current layer to electrically connect the smaller segments. The jumping will break the long interconnect in the layer and hence the charge collected on the long interconnect will not discharge through the gate oxide of the transistor and damage the gate oxide during the plasma etching process since the higher layer has not been fabricated yet. Layer hopping reduces an area of a segment connected to the gate of the transistor in a layer and resulting charge accumulation when the layer is fabricated but depending on where and how the layer hopping is performed by a routing tool in a net, a delay variation of signals in the integrated circuit 100 may range from −5% to +18% between nets in an example and violate design rule checking (DRC). Layer hopping performed by existing routing tools result in timing and design rule checking convergence challenges because the layer hopping is not performed consistently and predictably between certain layers of the integrated circuit or at a specific location of a segment of a net having an antenna violation. Further, the layer hopping is hard to model in timing considerations.

Antenna diodes is another solution remedying the antenna violation. Reverse bias diodes are added near the gate of the transistor to provide a discharge path for the accumulated charge on the gate during plasma etching. But the antenna diode needs to be placed in the channel 154 or 150 between macro circuits where space might not be available as a technology node decreases.

Embodiments disclosed herein are directed to an improved method and apparatus for fixing antenna violation associated with a segment of a net in a layer of the integrated circuit 100. During routing, an antenna cell is added to a portion of the segment to remedy the antenna violation in a layer. For example, if segment 140 electrically coupled to pin 116 will cause an antenna violation as an example in net N1, antenna cell 162 may replace a portion of the segment 140 in a layer to remedy the antenna violation. The antenna cell 162 is a predefined interconnect structure with a layer hopping to a top layer of the integrated circuit 100 and is electrically coupled to the segment 140 of the net N1 in a layer of integrated circuit 100 having the antenna violation at a predefined position on the segment 140 producing the antenna violation in the net N1. The predefined position may be a position on the segment 140 such that a ratio of a gate area to area of the net N1 between the pin 116 and antenna cell 160 is less than or equal to the antenna ratio threshold to remedy the antenna violation along the net N1. Further, the segment 140 may not be modified by any detours in electrically coupling the antenna cell 162 to the segment 140 in the layer which would affect timing or cause signal delay. In the integrated circuit 100, net N1 is described to have an antenna violation but in other examples nets of the integrated circuit 100 in other layers could have antenna violations which are remedied by respective instantiation of the disclosed antenna cell. Further, each instantiation of the antenna cell in the integrated circuit has a layer hoping only to a top layer such as M11 of the integrated circuit 100 depending on the technology node and the positioning of the antenna cell is based an area for the segment in the layer and an antenna ratio threshold of the integrated circuit 100. The predictability in positioning of the antenna cell in the disclosed manner and predictability of layer hopping to the top layer by the antenna cells allows for reducing timing variations between nets and reduces iterations needed to achieve design rule checking convergence while avoiding a need to place an antenna diode to remedy the antenna violation.

Figure 2:
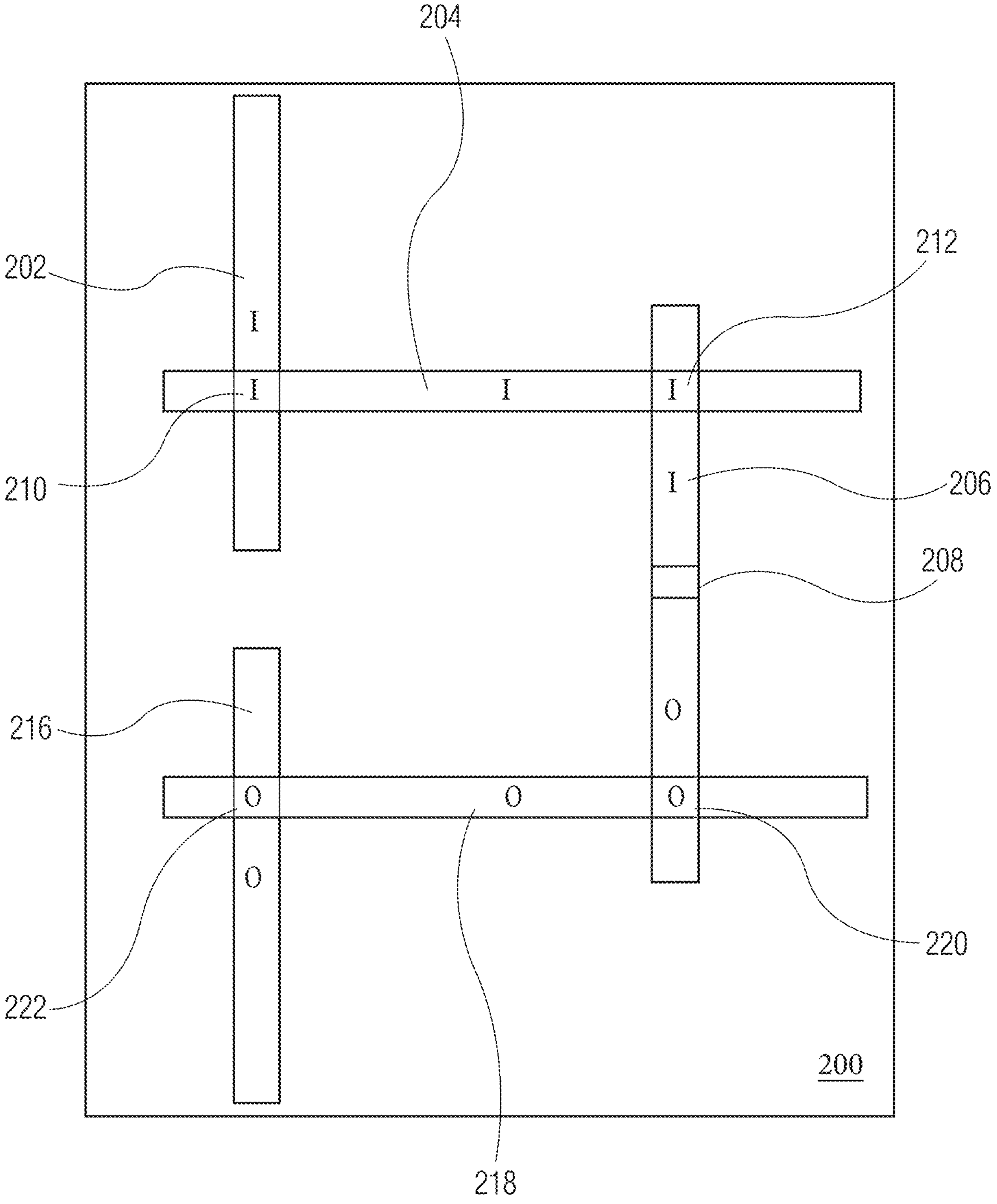
FIG. 2 is an example of an antenna cell design in accordance with an embodiment.

FIG. 2 is an example of an antenna cell 200 in accordance with an embodiment. The antenna cell 200 includes a plurality of metal traces in an example arranged in different layers of the integrated circuit. A portion of segment of a net in a layer may be replaced with the antenna cell 200 to remedy an antenna violation in the net.

For example, the antenna cell 200 may be arranged to have metal traces 202, 216 in a first layer such as one of M5 to MTop-2(where MTop is a highest layer of the integrated circuit such as M11 in a technology node and notation "−x" where x is 2 in this example indicates 2 layers down from MTop) and a metal trace 204, 218 in the second layer such as one of M6 to MTop-1 and which is in a higher layer than metal trace 202, 216. These metal traces may be in other layers depending on a sizing of the integrated circuit and net lengths. Further, the antenna cell 200 may have a metal trace 206 in a third layer such as an Mtop layer and have a low resistance resistor 208 (not a metal conductor) in the Mtop layer. In an example, the first layer and third layer may be both horizontal layers and the third layer is a vertical layer or the first layer and third layer may be both vertical layers and the third layer is a horizontal layer. The metal trace 202, 204, 206 in the different layers may be electrically coupled by metal routing through respective via 210, 212 in the layers of the integrated circuit 100 and the metal trace 216, 218, 206 in the different layers may be electrically coupled by metal routing through respective via 220, 222 in the layers of the integrated circuit 100. The low resistance resistor 208 may logically separate metal trace 202, 204, 206 associated with an input (I) of the antenna cell 200 electrically coupled to a pin and metal trace 216, 218, 206 associated with an output (O) of the antenna cell 200 electrically coupled to the other circuit 114 for purposes of DRC, routing tool operation, and other steps in fabrication. Metal traces 202, 204, 206 may be associated with an input (I) and metal traces 206, 216, 218 may be associated with an output (O) of the antenna cell 200. The antenna cell may be fabricated as layers of the integrated circuit are fabricated from a lower layer to the Mtop layer.

Instead of a segment in a net being a continuous metal trace which would result in an antenna violation, a portion of the segment of the net in a layer is replaced with the antenna cell 200 without causing any additional detours in the layer and electrically coupling the antenna cell 200 across a remainder of the segment. There is no additional detour in the layer because metal trace 202 and metal trace 216 are colinear with a remainder of the segment after adding the antenna cell 200. In an example, a portion of the net is electrically coupled between the input of the antenna cell and gate. In an example, a portion of the net is electrically coupled between the output of the antenna cell and other circuit and may be routed in any higher layer except for Mtop and with any length. There is no restriction because this portion is not electrically coupled to the gate of the transistor until the Mtop layer and layers below are fabricated and at the Mtop layer an antenna ratio is not violated for the net because the this portion of the net is not routed to the Mtop layer.

In the example, instantiations of the antenna cell may reserve the Mtop layer of the integrated circuit 100 for routing metal trace 208 of the antenna cell 200 so that the antenna violation at a lower layer is remedied by placement of the antenna cell 200. For any instantiation of the antenna cell in the integrated circuit, the trace 208 is arranged at the top layer of the integrated circuit 100 and independent of position of the instantiation in the integrated circuit. The disclosed antenna cell reduces variation in delay in the integrated circuit because an arrangement of the antenna cell 200 in the integrated circuit 100 and structure is consistent across different instantiations of the antenna cell in the integrated circuit. Further, fewer iterations to reach DRC convergence is needed because hopping to the Mtop layer is predictable.

Figure 3A:
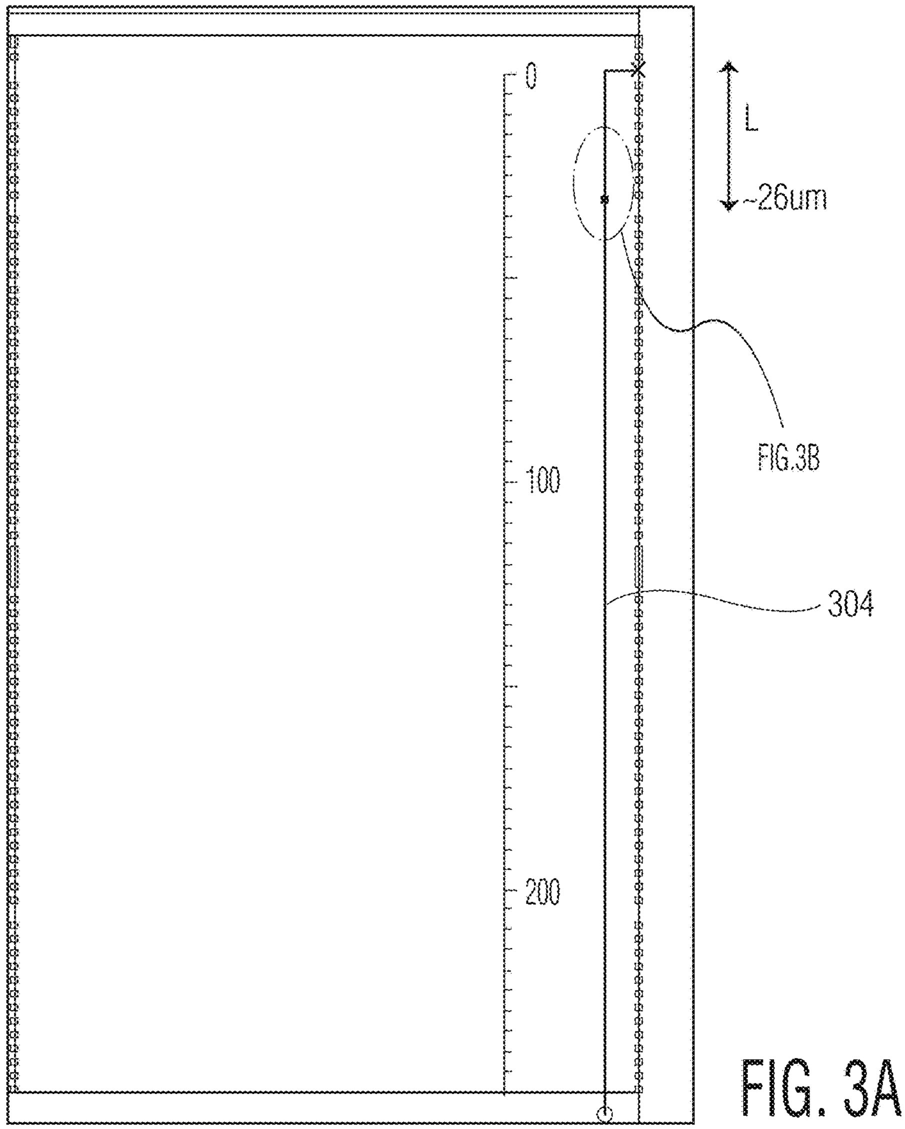
FIG. 3A & 3B illustrates an example of adding the antenna cell to a segment of a net in accordance with an embodiment.
Figure 3B:
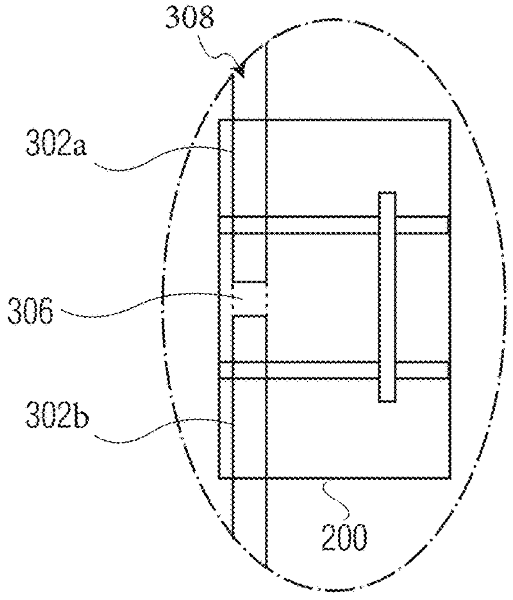

FIGS. 3A & 3B illustrate an example of adding the antenna cell 200 to a segment of a net in accordance with an embodiment. A net 304 may have a length of 260 um in an example electrically coupled to a pin shown as "x". The net 304 may also be electrically coupled to a gate of a macro circuit via the pin. In an example, the gate may have an area of 0.004 um. The integrated circuit 100 may have a defined antenna ratio threshold of 500 and a net width may be 0.076 um in an example. A minimum net length L for a net electrically coupled to a gate to avoid an antenna violation may be calculated as:

$$L*0.076 = 0.004*500$$

$$L = 2/0.076$$

$$L = 26\ \text{um}$$

and where 0.004 *500 is an acceptable net area. A position of a segment of the net to be fabricated in a layer where a distance from the gate to the position over the net equal to the net length L is determined. As shown in FIG. 3B, the segment of the net is shown as segment 308 in layer M9 with a portion of the segment 308 shown as a dotted line that would otherwise be fabricated being removed to form a gap 306 that is an electrical break. The input and output of antenna cell 200 is electrically coupled to the segment 302*a*, 302*b* of the segment 308 and spans the gap 306 so that the segment 302*a* of the net in the layer and electrically coupled to a gate of a transistor does not have an antenna violation and segment 302*b* is electrically coupled to the output of the antenna cell. Metal traces 202, 216 of the antenna cell 200 are in the layer M9 in the example, metal traces 204, 218 of the antenna cell may be in a layer M10 (where MTop is a highest layer of the integrated circuit such as M11in a technology node), and metal trace 208 is in layer MTop of the antenna cell in an example.

Table 3 indicates the area, PAR, and CAR for the different layers for segment of nets in the layers M1 to M9 after the antenna cell is inserted

TABLE 3

| Layer Name | Width | Length | Area | PAR (Area/Gatearea) | CAR |
|---|---|---|---|---|---|
| M1 | 0.02 | 0.42 | 0.0084 | 2.1 | 2.1 |
| M2 | 0.02 | 0.23 | 0.0046 | 1.15 | 3.25 |
| M3 | 0.02 | 0.33 | 0.0066 | 1.65 | 4.9 |
| M4 | 0.02 | 0.3 | 0.006 | 1.5 | 6.4 |
| M5 | 0.038 | 0.82 | 0.03116 | 7.79 | 14.19 |
| M6 | 0.076 | 0.56 | 0.04256 | 10.64 | 24.83 |
| M7 | 0.076 | 0.2 | 0.0152 | 3.8 | 28.63 |
| M8 | 0.076 | 7.8 | 0.5928 | 148.2 | 176.83 |
| M9 | 0.076 | 16.44 | 1.24944 | 312.36 | 489.19 |

The CAR before antenna cell insertion as shown in Table 1 was 1534.95 in M9 which violates the antenna ratio threshold of 500 in this example and Table 3 indicates after the antenna cell is inserted the PAR is 312.36 and the CAR is 489.19 in M9 and does not have an antenna violation since the CAR is less than the antenna ratio threshold of 500. The PAR and CAR is lower after insertion of the antenna cell 200 because the net area in the layer is based on the net coupled between the input of the antenna cell and the gate of the transistor. The positioning of the antenna cell 200 in the disclosed manner is predictable and the antenna cell has a predictable structure. Further, no detours is added to the segment 304 with the antenna violation to remedy the antenna violation. The use and positioning of the disclosed antenna cell 200 in nets with an antenna violation reduces delay variation between nets and improves design rule checking convergence while avoiding a need for placement of an antenna diode to remedy the antenna violation.

Figure 4:
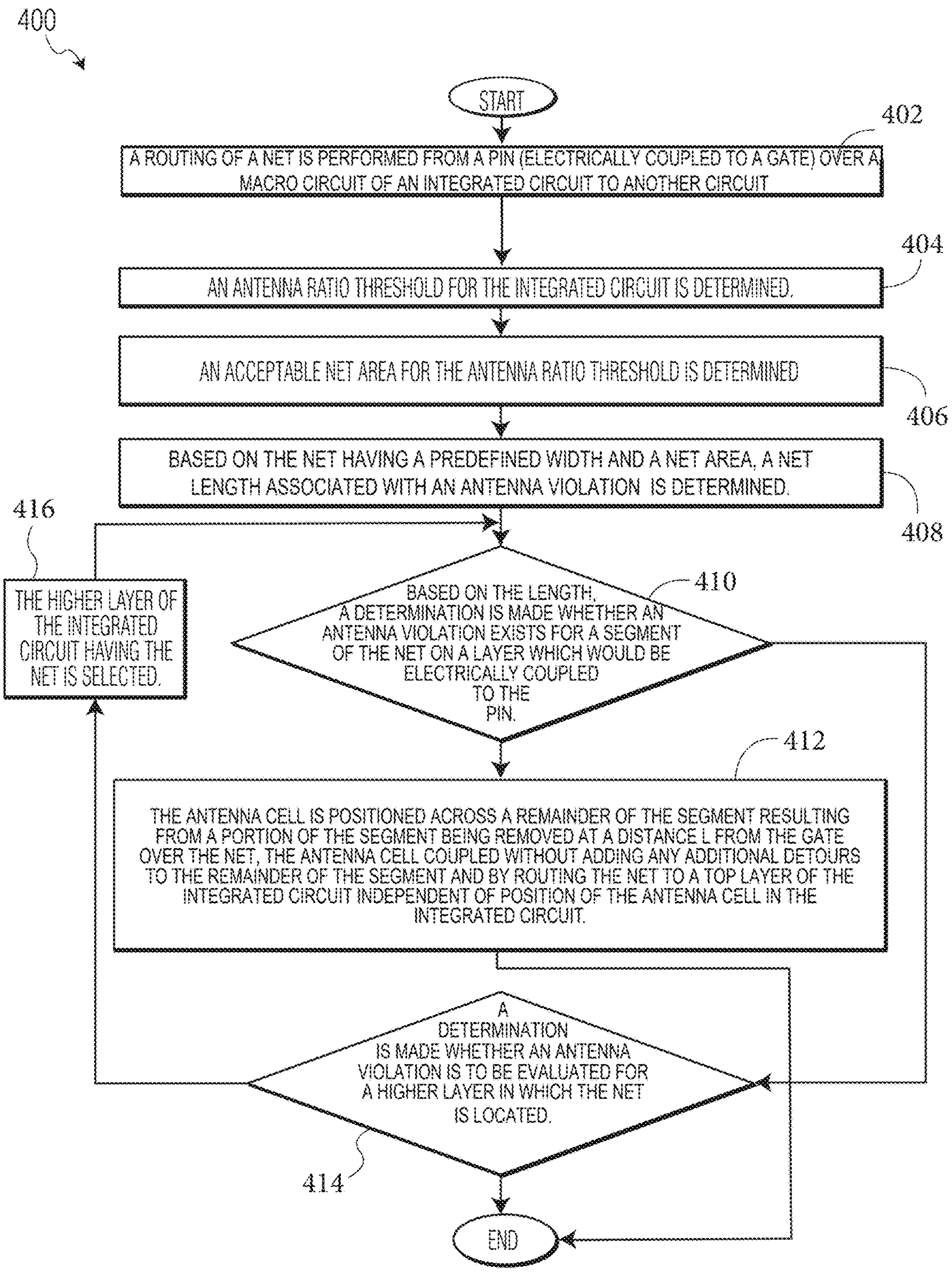
FIG. 4 is a flow chart of functions associated with instantiation of the antenna cell in the integrated circuit in accordance with an embodiment.

FIG. 4 is a flow chart 400 of functions associated with instantiation of the antenna cell in the integrated circuit in accordance with an embodiment. The functions may be performed as part of a routing process during fabrication of a layer and after floor planning where location, shape, and size of the macro circuits and pins are arranged in the integrated circuit and before placement in the layer where standard cells such as logic circuits are arranged in the macro circuits.

At 402, a routing of a net is performed from a pin (electrically coupled to a gate of a transistor) over a macro circuit of an integrated circuit to another circuit. A macro circuit may be a memory circuit in an example with a pin which is to be electrically coupled to the other circuit which interfaces with the macro circuit. The net may electrically couple the pin of the macro circuit to the other circuit and be arranged over the macro circuit in same layer and/or a higher layer of the integrated circuit than a layer in which the pin is located. At 404, an antenna ratio threshold for the integrated circuit is determined. The antenna ratio threshold may be defined by a process for fabrication of the integrated circuit and in an example may be 500. At 406, an acceptable net area for the antenna ratio threshold is determined. Based on the net having a predefined width and a net area, a net length L associated with an antenna violation is determined at 408. At 410, a determination is made whether an antenna violation would exist for a segment of the net on a layer which is to be electrically coupled to the pin. A violation exists if a distance from the gate to a position on the segment over the net is equal to the length L. If an antenna violation exists, at 412, the antenna cell is positioned across a remainder of the segment resulting from a portion of the segment being removed at a distance length L from the gate over the net, without adding any additional detours to the remainder of the segment, and by routing the net to a top layer of the integrated circuit independent of position of the antenna cell in the integrated circuit. Antenna violation processing then terminates for the net because so long as a portion of the net from an output of the antenna cell to the other circuit is not routed to the top layer, the net will not have an antenna violation. The layer and then higher layers are fabricated to include metal traces of the antenna cell. If an antenna violation does not exist, then the layer is fabricated and processing continues to step 414. At 414, a determination is made whether an antenna violation is to be evaluated for a higher layer in which the net is located. If all layers have not been evaluated, processing continues to step 416 where the higher layer of the integrated circuit having the net is selected and processing continues at step 410. If all layers have been evaluated, then processing ends. In an example, steps 402-416 may be executed for each net in each layer of the integrated circuit which might have an antenna violation.

Figure 5:
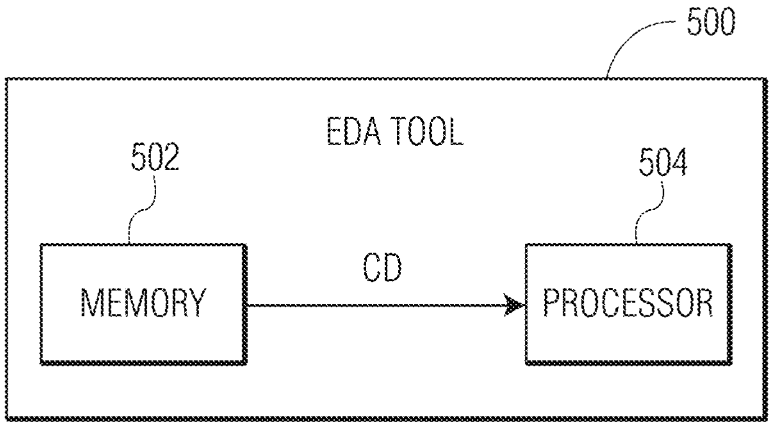
FIG. 5 illustrates a schematic block diagram of an electronic design automation (EDA) tool for adding the antenna cell in the integrated circuit in accordance with an embodiment.

FIG. 5 illustrates a schematic block diagram of an electronic design automation (EDA) tool 500 for adding the antenna cell in the integrated circuit in accordance with an embodiment. The EDA tool 500 may be a routing tool configured to enable the antenna cell instantiation in the integrated circuit 100 in accordance with embodiments. The EDA tool 500 can include a memory 502 and a processor 504 that can be coupled with the memory 502. The processor 504 and the memory 502 form a computer system that may represent a stand-alone personal computer or a network of processors in an example.

The memory 502 can include suitable circuitry that can be configured to perform one or more operations. For example, the memory 502 can be configured to store the control data (hereinafter referred to and designated as the "control data CD"). Examples of the memory 502 can include a static random-access memory, a dynamic random-access memory, a flash memory, or the like.

The processor 504 can include suitable circuitry that can be configured to perform one or more operations. For example, the processor 504 can be configured to retrieve the control data CD from the memory 502. Based on the control data CD, the processor 304 can be configured to arrange macro circuits in various rows and columns and perform net routing over the macro circuits in an example. Examples of the processor 504 can include, but are not limited to, an application-specific integrated circuit processor, a reduced instruction set computing processor, a complex instruction set computing processor, a field-programmable gate array, or the like.

Further, the processor 504 may perform functions to avoid an antenna violation in a net. The processor 504 may perform functions 400 in an example during net routing to identify net area which results in an antenna violation. The memory 502 may store an instantiation of the antenna cell 200 and the processor 502 may determine a length of a segment in a layer which results in an antenna violation. The antenna cell 200 is electrically coupled across a remainder of the segment after a portion of the segment at the determined length is removed. The EDA tool is able to modify the net to avoid antenna violation in a predicable manner and without need to add antenna diodes or in designs with limited channel spacing available for metal routing. Further, the antenna cell is added without additional detour in an example reducing delay variation between macro circuits. The antenna cell may be also able to be easily modeled making timing closure more predictable in later steps of semiconductor processing fabrication of the layers.

In one embodiment, a method for fixing antenna violations of antennas in an integrated circuit is disclosed. The method comprises: selecting a pin of a macro circuit, the pin being electrically coupled to a gate of a transistor; determining a gate area of the gate and an antenna ratio for the integrated circuit; calculating a net area of a net which avoids antenna violation in the integrated circuit; identifying a length of the net with the net area based on the gate area and the antenna ratio; and positioning the antenna cell across a remainder of a segment of the net in a layer resulting from a portion of the segment being removed, a distance from the portion to the gate over the net being the length, wherein the antenna cell routes the net to a top layer of the integrated circuit independent of a position of the antenna cell in the integrated circuit. In an example, the net comprises a metal trace and wherein identifying the length comprises calculating the length as the gate area * antenna ratio/width of the net. In an example, coupling of the antenna cell does not add any detours to the segment in the layer of the net. In an example, the method further comprises removing the portion of the segment before fabrication of the segment in the layer. In an example, the distance from an input of the antenna cell to the gate over the net is the length of the net with the net area and any distance from an output of the antenna cell and another circuit over the net will not cause an antenna violation, the net from the output of the antenna cell to the other circuit not being routed to the top layer independent of the position of the antenna cell in the integrated circuit. In an example, the antenna cell has a first layer which is one of an Mn to top layer-2 metal layer of the integrated circuit, a second layer which is one of the Mn+1 to top layer-1 metal layer above the first layer of the integrated circuit, and the top layer is a highest metal layer of the integrated circuit. In an example, the steps of selecting, determining, calculating, identifying, removing, and inserting are performed by an electronic design automation (EDA) tool. In an example, the macro circuit is a memory circuit and the net is routed over the memory circuit.

In another embodiment, plurality of antenna cells arranged in an integrated circuit is disclosed. Each antenna cell in the integrated circuit comprises: a first metal trace arranged in a first layer of the integrated circuit in a first direction; a second metal trace arranged in a second layer of the integrated circuit in a second direction, the second layer being higher than the first layer; a third trace metal arranged in a top layer of the integrated circuit in the first direction; wherein the first trace and second trace are electrically coupled by a first via from the first layer to the second layer; and wherein the second trace and third trace are electrically coupled by a second via from the second layer to the top layer; wherein lengths of the traces in each antenna cell are the same. In an example, the first layer is one of an Mn to top layer-2 metal layer of the integrated circuit, the second layer is one of the Mn+1 to top layer-1 metal layer above the first layer of the integrated circuit, and the top layer is a highest metal layer of the integrated circuit. In an example, all of the antenna cells in the integrated circuit have the third trace metal in the top layer. In an example, the third trace comprises a resistor.

In yet another embodiment, an integrated circuit layout is disclosed, the IC comprises: a plurality of antenna cells; a plurality of nets arranged in the integrated circuit, each net comprising an antenna cell, a gate, and a segment in a layer of the net, the antenna cell being positioned across a remainder of the segment resulting from a portion of the segment being removed, a distance from the portion to the gate over the net being a length to remedy an antenna violation of the net in the integrated circuit layout; wherein each antenna cell in the integrated circuit comprises: a first metal trace arranged in a respective first layer of the integrated circuit in a first direction; a second metal trace arranged in a respective second layer of the integrated circuit in a second direction, the second layer being higher than the first layer; a third metal trace arranged in a top layer of the integrated circuit in the first direction; wherein the first metal trace and second metal trace are electrically coupled by a first via from the respective first layer to the respective second layer; wherein the second metal trace and metal third trace are electrically coupled by a second via from the respective second layer to the top layer. In an example, each net is routed over a macro circuit in the integrated circuit. In an example, the first layer is one of an Mn to top layer-1 metal layer of the integrated circuit, the second layer is one of an Mn+1 to top layer-1 metal layer of the integrated circuit, and the top layer is a highest metal layer of the integrated circuit. In an example, for a net of the plurality of nets the distance from an input of the antenna cell to the gate over the net is the length of the net with the net area and any distance from an output of the antenna cell and another circuit over the net will not cause an antenna violation, the net from the output of the respective antenna cell and to the other circuit not being routed to the top layer independent of the position of the respective antenna cell in the integrated circuit layout. In an example, the segment has no additional detours in the layer to electrically couple to the respective antenna cell. In an example, all antenna cells in the layout have the third metal trace at the top layer. In an example, the length is a gate area * antenna ratio/width of the net. In an example, the third metal trace has a resistor.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

What is claimed is:

1. A method for fixing antenna violations of antennas in an integrated circuit, the method comprising:

selecting a pin of a macro circuit, the pin being electrically coupled to a gate of a transistor;

determining a gate area of the gate and an antenna ratio for the integrated circuit;

calculating a net area of a net which avoids antenna violation in the integrated circuit;

identifying a length of the net with the net area based on the gate area and the antenna ratio; and positioning the antenna cell across a remainder of a segment of the net in a layer resulting from a portion of the segment being removed, a distance from the portion to the gate over the net being the length, wherein the antenna cell routes the net to a top layer of the integrated circuit independent of a position of the antenna cell in the integrated circuit.

2. The method of claim 1, wherein the net comprises a metal trace and wherein identifying the length comprises calculating the length as the gate area * antenna ratio/width of the net.

3. The method of claim 1, wherein coupling of the antenna cell does not add any detours to the segment in the layer of the net.

4. The method of claim 1, further comprising removing the portion of the segment before fabrication of the segment in the layer.

5. The method of claim 1, wherein the distance from an input of the antenna cell to the gate over the net is the length of the net with the net area and any distance from an output of the antenna cell and another circuit over the net will not cause an antenna violation, the net from the output of the antenna cell to the other circuit not being routed to the top layer independent of the position of the antenna cell in the integrated circuit.

6. The method of claim 1, wherein the antenna cell has a first layer which is one of an Mn to top layer-2 metal layer of the integrated circuit, a second layer which is one of the Mn+1 to top layer-1 metal layer above the first layer of the integrated circuit, and the top layer is a highest metal layer of the integrated circuit.

7. The method of claim 1, wherein the steps of selecting, determining, calculating, identifying, removing, and inserting are performed by an electronic design automation (EDA) tool.

8. The method of claim 1, wherein the macro circuit is a memory circuit and the net is routed over the memory circuit.

* * * * *